United States Patent
Lubetzky et al.

(10) Patent No.: US 9,575,809 B2
(45) Date of Patent: Feb. 21, 2017

(54) DISTRIBUTED STOCHASTIC CLUSTERING FOR AUTOMATED FORMATION OF CONNECTED NETWORKS OF AGENTS

(75) Inventors: Eyal Lubetzky, Seattle, WA (US); Yuval Peres, Redmond, WA (US); Dahlia Malkhi, Palo Alto, CA (US); Po-Shen Loh, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1164 days.

(21) Appl. No.: 13/347,674

(22) Filed: Jan. 10, 2012

(65) Prior Publication Data

US 2013/0179487 A1   Jul. 11, 2013

(51) Int. Cl.
*G06F 15/16* (2006.01)
*G06F 9/50* (2006.01)
*H04L 12/12* (2006.01)

(52) U.S. Cl.
CPC .............. *G06F 9/5061* (2013.01); *H04L 12/12* (2013.01); *Y02B 60/34* (2013.01)

(58) Field of Classification Search
CPC ......... G06F 9/5061; H04L 12/12; Y02B 60/34
USPC ........................................................ 709/202
See application file for complete search history.

(56) References Cited

U.S. PATENT DOCUMENTS

| | | | |
|---|---|---|---|
| 7,120,681 B2 | 10/2006 | Frelechoux et al. | |
| 7,551,570 B2 | 6/2009 | Nurminen et al. | |
| 8,024,432 B1 | 9/2011 | Sharma et al. | |
| 2007/0299950 A1* | 12/2007 | Kulkarni | H04L 45/00 709/223 |
| 2008/0205360 A1 | 8/2008 | Ren et al. | |
| 2009/0083390 A1* | 3/2009 | Abu-Ghazaleh et al. | 709/209 |
| 2009/0092112 A1 | 4/2009 | Kim et al. | |

OTHER PUBLICATIONS

Bettstetter, et al., "Scenario—Based Stability Analysis of the Distributed Mobility-Adaptive Clustering (DMAC) Algorithm", Retrieved at <<http://scholar.googleusercontent.com/scholar?q=cache:doFXEcVmZelJ:scholar.google.com/&hl=en&as_sdt=0,5>>, ACM MobiHoc, Oct. 4-5, 2001, pp. 232-241.

(Continued)

*Primary Examiner* — Joseph Greene
(74) *Attorney, Agent, or Firm* — Alin Corie; Cassandra T. Swain; Micky Minhas

(57) ABSTRACT

A "Stochastic Clustering-Based Network Generator" enables rapid formation of an interconnected hierarchical network structure from an arbitrary number of agents via an iterative turn-based coalescence process. Given N agents wishing to coalesce into one hierarchical network, a turn-based process allows each agent (or the head of each hierarchical cluster of agents), to randomly decide whether to issue or listen for merge requests in each round. Issuing a request amounts to contacting a randomly chosen agent with a merge request. Given multiple received requests, a cluster head will randomly accept one request for a merge received by any agent in that cluster. The requesting cluster then merges as a hierarchical child of the accepting cluster. In a related embodiment, given multiple merge requests, the request from the smallest cluster is accepted. In further embodiments, ties of the smallest cluster size are broken based on various options.

20 Claims, 4 Drawing Sheets

(56) References Cited

OTHER PUBLICATIONS

Aldous, David., "Asymptotic Fringe Distributions for General Families of Random Trees", Retrieved at <<http://projecteuclid.org/DPubS/Repository/1.0/Disseminate?view=body&id=pdf_1&handle=euclid.aoap/1177005936>>, The Annals of Applied Probability, vol. 01, No. 2, 1991, pp. 228-266.

Aldous, David., "Deterministic and Stochastic Models for Coalescence (Aggregation, Coagulation): A Review of the Mean-Feld Theory for Probabilists", Retrieved at <<http://www.stat.berkeley.edu/~aldous/Papers/me78.pdf>>, Jul. 10, 1997, pp. 1-59.

Cooper, et al., "Fast Perfect-Information Leader-Election Protocols with Linear Immunity", Retrieved at <<http://www.cs.huji.ac.il/~nati/PAPERS/kupi.pdf>>, Combinatorica, vol. 15, No. 3, 1995, pp. 319-332.

Erdös, et al., "On the Evolution of Random Graphs", Retrieved at <<http://citeseer.ist.psu.edu/viewdocldownload;jsessionid=E03E22F95236429EC87D1ECB9B6B1E10?doi=10.1.1.153.5943&rep=rep1&type=pdf>>, Publication of the Mathematical Institute of the Hungarian Academy of Sciences, 1960, pp. 17-61.

Fernandess, et al., "On Spreading Recommendations via Social Gossip", Retrieved at <<http://citeseerx.ist.psu.edu/viewdoc/download?doi=10.1.1.187.5464&rep=rep1&type=pdf>>, Proceedings of the twentieth annual symposium on Parallelism in algorithms and architectures, Jun. 14-16, 2008, pp. 7.

Fill, et al., "On the Distribution for the Duration of a Randomized Leader Election Algorithm", Retrieved at http://citeseerx.ist.psu.edu/viewdoc/download;jsessionid=7B031499D855C0B5E31FD6CF04532AE2?doi=10.1.1.54.8283&rep=rep1&type=pdf>>, The Annals of Applied Probability, vol. 06, No. 4, Mar. 1996, pp. 1-27.

Freedman, David A., "On Tail Probabilities for Martingales", Retrieved at <<http://projecteuclid.org/DPubS/Repository/1.0/Disseminate?view=body&id=pdf_1&handle=euclid.aop/1176996452>>, The Annals of Probability, vol. 03, No. 1, Feb. 1975, pp. 100-118.

Galil, ZVI., "Data Structures and Algorithms for Disjoint Set Union Problems", Retrieved at <<http://erwincoumans.com/ftp/pub/test/physics/papers/unionfind_performance_p319-galil.pdf>>, ACM Computing Surveys (CSUR), vol. 23, No. 3, Sep. 1991, pp. 319-344.

Gazit, Hillel., "An Optimal Randomized Parallel Algorithm for Finding Connected Components in a Graph", Retrieved at <<http://ieeexplore.ieee.org/stamp/stamp.jsp?tp=&arnumber=4568240>>, 27th Annual Symposium on Foundations of Computer Science, Oct. 27-29, 1986, pp. 492-501.

"The Coalescent", Retrieved at <<http://darwin.eeb.uconn.edu/eeb348/lecture-notes/coalescent.pdf>>, Retrieved Date: Mar. 14, 2012, pp. 1-7.

Miller, et al., "Parallel Tree Contraction and Its Application", Retrieved at http://ieeexplore.ieee.org/stamp/stamp.jsp?tp=&arnumber=4568174>>, 26th Annual Symposium on Foundations of Computer Science, Oct. 21-23, 1985, pp. 478-489.

Ostrovsky, et al., "Simple and Efficient Leader Election in the Full Information Model", Retrieved at <<http://www.eecs.berkeley.edu/Pubs/TechRpts/1994/CSD-94-800.pdf>>, Proceedings of the Twenty-Sixth Annual ACM Symposium on Theory of Computing, May 23-25, 1994, pp. 0-9.

Russell, et al., "Perfect Information Leader Election in Log*n + O(1) Rounds", Retrieved at <<http://ieeexplore.ieee.org/stamp/stamp.jsp?tp=&arnumber=743508>>, 39th Annual Symposium on Foundations of Computer Science, Nov. 8-11, 1998, pp. 8.

Spencer, et al., "Birth Control for Giants", Retrieved at <<https://cs1.cs.nyu.edu/cs/faculty/spencer/papers/wormaldgiants.pdf>>, Combinatorica, vol. 27, No. 5, Sep. 2007, pp. 1-27.

Zuckerman, David., "Randomness-Optimal Oblivious Sampling", Retrieved at <<http://citeseerx.ist.psu.edu/viewdoc/download?doi=10.1.1.32.9712&rep=rep1&type=pdf>>, Random Structures and Algorithms, vol. 11, No. 4, 1997, pp. 1-17.

* cited by examiner

DISTRIBUTED STOCHASTIC CLUSTERING FOR AUTOMATED FORMATION OF CONNECTED NETWORKS OF AGENTS

BACKGROUND

Technical Field

A "Stochastic Clustering-Based Network Generator" provides various automated techniques that enable rapid formation of an interconnected hierarchical network structure from an arbitrary number of agents via an iterative turn-based coalescence process.

Background

Conventional stochastic coalescence techniques typically involve processes that act via a continuous-time process where the coalescence rate of two clusters with given masses x,y (which can be either discrete or continuous) is dictated up to re-scaling by a rate kernel K. One well-known example of such techniques, referred to as "Kingman's coalescent," corresponds to the kernel $K(x,y)=1$ and has been intensively studied in mathematical population genetics. In general, Kingman's coalescent can be obtained as the continuous/infinite limit of a process where at each time t there is a population of N individuals, and each individual picks a parent at random from the previous generation of individuals, located in time t+1/N. Other examples of highly studied rate kernels include "Aldous's continuum random tree" which provides the additive coalescent $K(x,y)=x+y$, and "Erdos-Renyi random graphs" which provide the multiplicative coalescent $K(x,y)=xy$. These types of classical stochastic coalescence processes are generally understood to function as an asynchronous series of individual merges whose occurrences are governed by independent exponentials.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Stochastic Clustering-Based Network Generator," as described herein, provides various techniques that enable rapid formation of an interconnected hierarchical network structure from an arbitrary set of N agents via an iterative turn-based coalescence process.

Note that agents are specifically defined herein as any type of computing device having network communications capabilities. Such computing devices include, but are not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

Note also that during the coalescence process, any agent that is not currently in a hierarchical cluster is considered a "head node," such agents are also referred to as "singletons," with all agents being singletons at the initialization of the coalescence process. Furthermore, all hierarchical clusters of two or more agents have a single agent at the root of that cluster (i.e., the uppermost level in the hierarchically) that acts as the head node of that cluster. Therefore, once the coalescence is complete, there will be only a single hierarchical network structure with a single head node for the entire cluster of agents.

At each turn or round of the iterative turn-based coalescence process, each head node makes a random determination as to whether it will receive merge requests or issue merge requests. Head nodes making or issuing requests are referred to herein as "requestors," while head nodes receiving requests are referred to herein as "listeners."

When a requestor issues a merge request, that request is sent to a single randomly chosen agent from within the entire set of agents. Requests received by an agent that is not a head node are recursively passed by that agent to its head node. Requests received by a head node that is also a requestor in the current round are ignored by that head node. One or more requests received by a head node, either directly or when passed up from a child agent, are considered for acceptance by that head node only when the head node is acting as a listener in the current round.

In particular, a listener receiving only one request will simply accept that request for a merge. However, given multiple received requests, a listener will randomly accept only one of the requests for a merge. When a request is accepted by a listener, the requestor, along with any child cluster attached to that requestor, merges with the listener as a direct child of the agent that was originally contacted with the merge request to form a hierarchy. The above-summarized turn-based process then repeats until all agents or agent clusters have merged to the point where a single hierarchical network structure has been formed with a single head node.

In a related embodiment, merge requests are sent along with the current cluster size of the requestor. In this embodiment, given multiple merge requests received by a listener, the merge request from the head node of the smallest cluster is accepted rather than making a random acceptance. In various embodiments, ties of the smallest cluster size are broken based on various options such as random selection of the smallest, overall cluster network latency, maximum or minimum cluster hierarchical depth, etc. Further, in additional embodiments, the length of any branch in the hierarchical structure is capped at a predetermined or user-adjustable maximum value such that requests to an agent already at that maximum length will simply be ignored by that agent or that agents head node.

In view of the above summary, it is clear that the Stochastic Clustering-Based Network Generator described herein provides various techniques that enable rapid formation of an interconnected hierarchical network structure from an arbitrary number of agents via an iterative turn-based coalescence process. In addition to the just described benefits, other advantages of the Stochastic Clustering-Based Network Generator will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
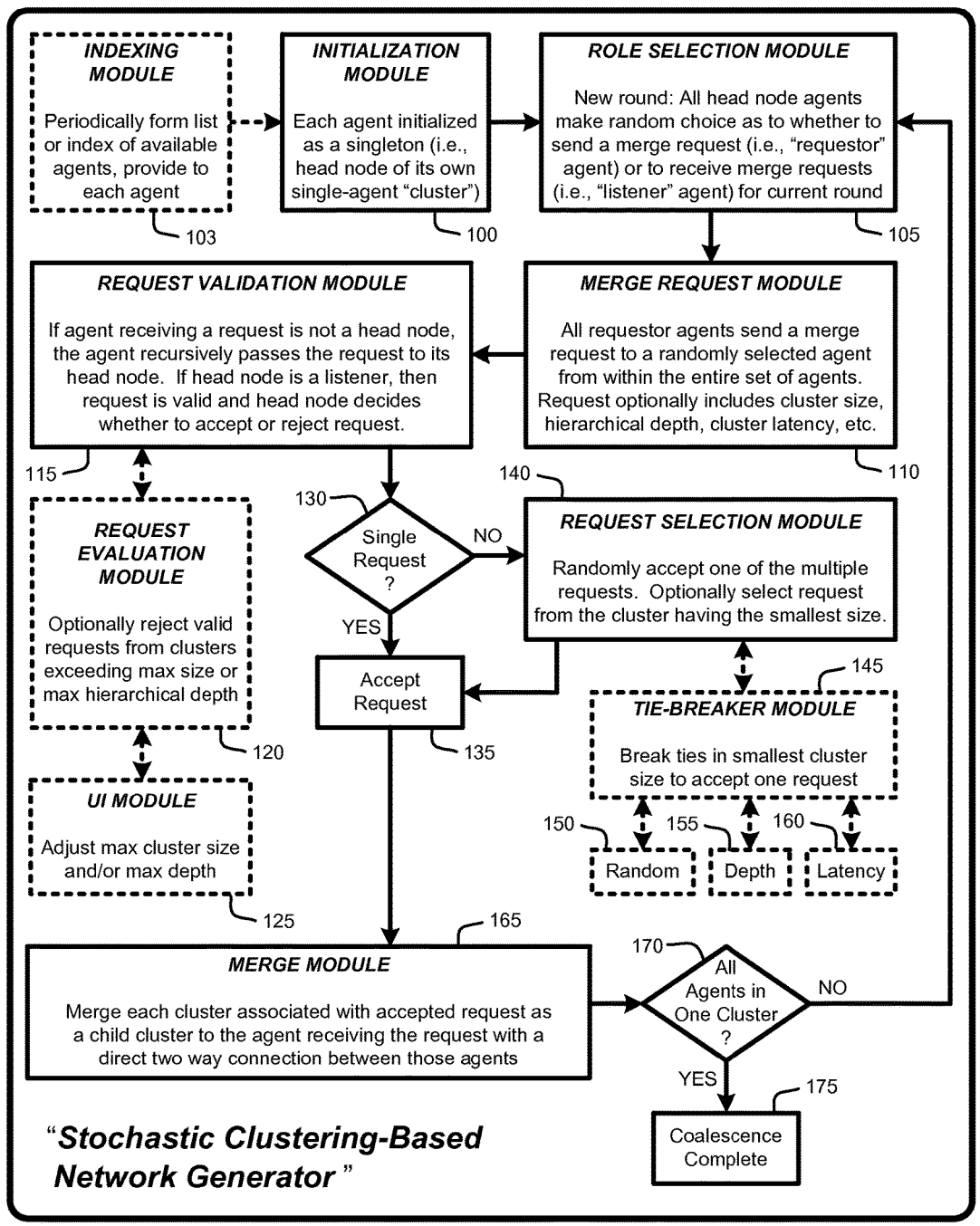
FIG. 1 illustrates an exemplary architectural flow diagram that illustrates program modules for implementing various embodiments of a "Stochastic Clustering-Based Network Generator" that automatically forms a hierarchical network structure from an arbitrary set of computing devices (referred to herein as "agents") via a turn-based coalescence process, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, a "Stochastic Clustering-Based Network Generator," as described herein, provides various techniques that enable rapid formation of an interconnected hierarchical network structure from an arbitrary set of N agents via an iterative turn-based coalescence process. The synchronous nature of this coalescence process is enabled by rounds where all clusters of agents act simultaneously and the outcome of a round is a set of multiple disjoint merges that are a function of these combined actions.

Note that agents are defined herein as any type of computing device having network communications capabilities. Such computing devices include, but are not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

Note also that during the coalescence process, any agent that is not currently in a hierarchical cluster is considered a "head node," such agents are also referred to as "singletons," with all agents being singletons at the initialization of the coalescence process. Furthermore, all hierarchical clusters of two or more agents have a single agent at the root of that cluster (i.e., the uppermost level in the hierarchically) that acts as the head node of that cluster. Therefore, once the coalescence is complete, there will be only a single hierarchical network structure with a single head node (i.e., a single root) for the entire cluster of agents.

In contrast to conventional stochastic coalescence techniques where the coalescence rate of two clusters is given by some rate kernel K as a function of their masses, the coalescence rate of the Stochastic Clustering-Based Network Generator is a function of the entire cluster distribution. Furthermore, in contrast to conventional "Random Mate" type applications (which have been used for purposes such as parallel graph components and parallel tree contraction), the network coalescence processes described herein evolve through time without the need for any of the agents to consider the distributions or clusters of other peers.

In various embodiments, the arbitrary set of N agents is periodically or occasionally constructed or updated using any desired technique for forming a list or index of participating or available agents (e.g., by using the agents to identify themselves to each other using various P2P techniques). Each agent is then provided either with a copy of the resulting list or index of agents, or provided with access to the resulting list or index. Advantageously, using the agents to self-report using various P2P type techniques eliminates the need for a central server or the like to identify or maintain the list or set of agents. However, it should be understood that a central server could be used for this purpose, if desired. In either case, it should be understood that the coalescence processes described herein assume that the list or index of agents is available to the agents at the beginning of the coalescence process, and that formation of this list or index is not generally performed at the beginning of any particular network formation session.

Note that it has been observed that the above-described process that makes a random selection given multiple requests to a listener concludes in superlogarithmic time relative to the number of agents. However, in the related embodiment where incoming merge requests from the smallest cluster are favored in the case of multiple requests to a listener, it has been observed that this process coalesces much faster with conclusion of network formation occurring in a number of rounds that is logarithmic in N (i.e., the total number of agents).

1.1 System Overview

As noted above, the "Stochastic Clustering-Based Network Generator," provides various techniques that enable rapid formation of an interconnected hierarchical network structure from an arbitrary set of N agents via an iterative turn-based coalescence process. The processes summarized above are illustrated by the general system diagram of FIG. 1. In particular, the system diagram of FIG. 1 illustrates the interrelationships between program modules for implementing various embodiments of the Stochastic Clustering-Based Network Generator, as described herein. Furthermore, while the system diagram of FIG. 1 illustrates a high-level view of various embodiments of the Stochastic Clustering-Based Network Generator, FIG. 1 is not intended to provide an exhaustive or complete illustration of every possible embodiment of the Stochastic Clustering-Based Network Generator as described throughout this document.

In addition, it should be noted that any boxes and interconnections between boxes that may be represented by broken or dashed lines in FIG. 1 represent alternate embodiments of the Stochastic Clustering-Based Network Generator described herein, and that any or all of these alternate embodiments, as described below, may be used in combination with other alternate embodiments that are described throughout this document.

In general, as illustrated by FIG. 1, the processes enabled by the Stochastic Clustering-Based Network Generator begin operation by using an initialization module 100 running on each agent that initializes each agent as a singleton (i.e., head node of a single-agent cluster) and provides each agent with a list or set of all other participating agents. Further, this list or set of available agents includes the information necessary (e.g., IP address, etc.) for each agent to contact any other agent in the set of agents.

Note that In various embodiments, the list or set of participating agents is periodically or occasionally constructed or updated by an optional indexing module 103. In general, the indexing module 103 uses conventional means, such as, for example, typical P2P techniques that allow peers (or agents) to contact other peers using various wired or wireless reporting protocols. In other words, the indexing module 103 uses any desired technique for forming a list or index of participating or available agents whenever necessary, with that list or index then being provided to participating agents, as needed. However, it should be understood that the coalescence processes described herein assume that the list or index of agents is available to each participating agent at the beginning of the coalescence process, and that formation of this list or index is not generally performed at the beginning of any particular network formation session.

Following the initialization process performed by the initialization module 100, a role selection module 105 running on each head node is used at the beginning of each round to allow all head nodes to make a random selection from one of two available roles for the current round. The available roles include a "requestor" agent that will make merge requests and a "listener" agent that will receive merge requests for the current round.

Once these roles have been selected, a merge request module 110 running on each requestor agent is used by requestors to send a merge request to a randomly selected agent from within the entire set of agents. Note that in various embodiments, this request may also include additional optional information that includes, but is not limited to cluster size of the requestor, hierarchical depth (number of levels) of agent children of the requestor, requestor cluster network latency information (may also be automatically derived from packet information on the network), etc.

Once each of the requestors has sent a request to a randomly selected agent, a request validation module 115 running on each agent makes a determination as to whether any received merge requests are valid. In particular, requests received by an agent that is not a head node are recursively passed by that agent to its head node. Requests received by a head node that is also a requestor in the current round are ignored by that head node. One or more requests received by a head node, either directly or when passed up from a child agent, are considered to be valid merge requests by that head node only when the head node is acting as a listener in the current round.

In a related embodiment, valid merge request are further evaluated by a request evaluation module 120. In general, the request validation module 120 optionally rejects or invalidates otherwise valid merge requests from clusters that are already at a maximum allowable size and/or that are already at a maximum allowable hierarchical depth. Note that an optional UI module 125 is provided in various embodiments to adjust or set these maximum values.

In either case, once one or more valid requests are available to any head node acting in the role of a listener in the current round, each of those listeners decide whether to accept a single one of those merge requests. In particular, if the listener has received 130 only a single valid request, then that merge request is accepted 135. However, if any listener has received two or more valid requests for the current round, then a request selection module 140 is used by that listener select a single merge request from among the available valid merge requests. In general, given multiple valid merge requests, the listener will simply make a random selection from among those requests, with the single selected request then being accepted 135. Note that due to the random nature of merge requests, it is also possible that any particular listener will not receive any merge requests in a particular round.

In various embodiments, rather than select a random request, the request selection module 140 is used by the listener to optionally select a single request originating from the cluster having the smallest size. In this case, it is possible that multiple requests can originate from different clusters having the same smallest size. Therefore, to address such issues, an optional tie-breaker module 145 is provided to select from among two or more merge requests from clusters having the same smallest size. Tie breaking in this case is performed based on one of several optional criteria. For example, in one embodiment, a single selection from among tied requests is made via a random 150 selection. In another embodiment, a single selection from among tied requests is made via by selecting the cluster having the smallest hierarchical depth 155. In another embodiment, a single selection from among tied requests is made by selecting the cluster having the smallest network latency 160.

Once one or more of the listeners have accepted a single request, a merge module 165 is used to perform the corresponding disjoint merges. In particular, the requestor, along with any child agents clustered or attached to that requestor, merge with the listener cluster as a direct child of the agent that was originally contacted with the merge request to form a hierarchy.

A check 170 is then made to determine whether all of the agents have coalesced into a single cluster. If true, the coalescence is complete 175. However, if the agents have not all coalesced into a single cluster, the above-summarized turn-based process then repeats, beginning with a new round using the role selection module 105, until all agents or agent clusters have merged to the point where a single hierarchical network structure has been formed with a single head node.

2.0 Operational Details

Figure 2:
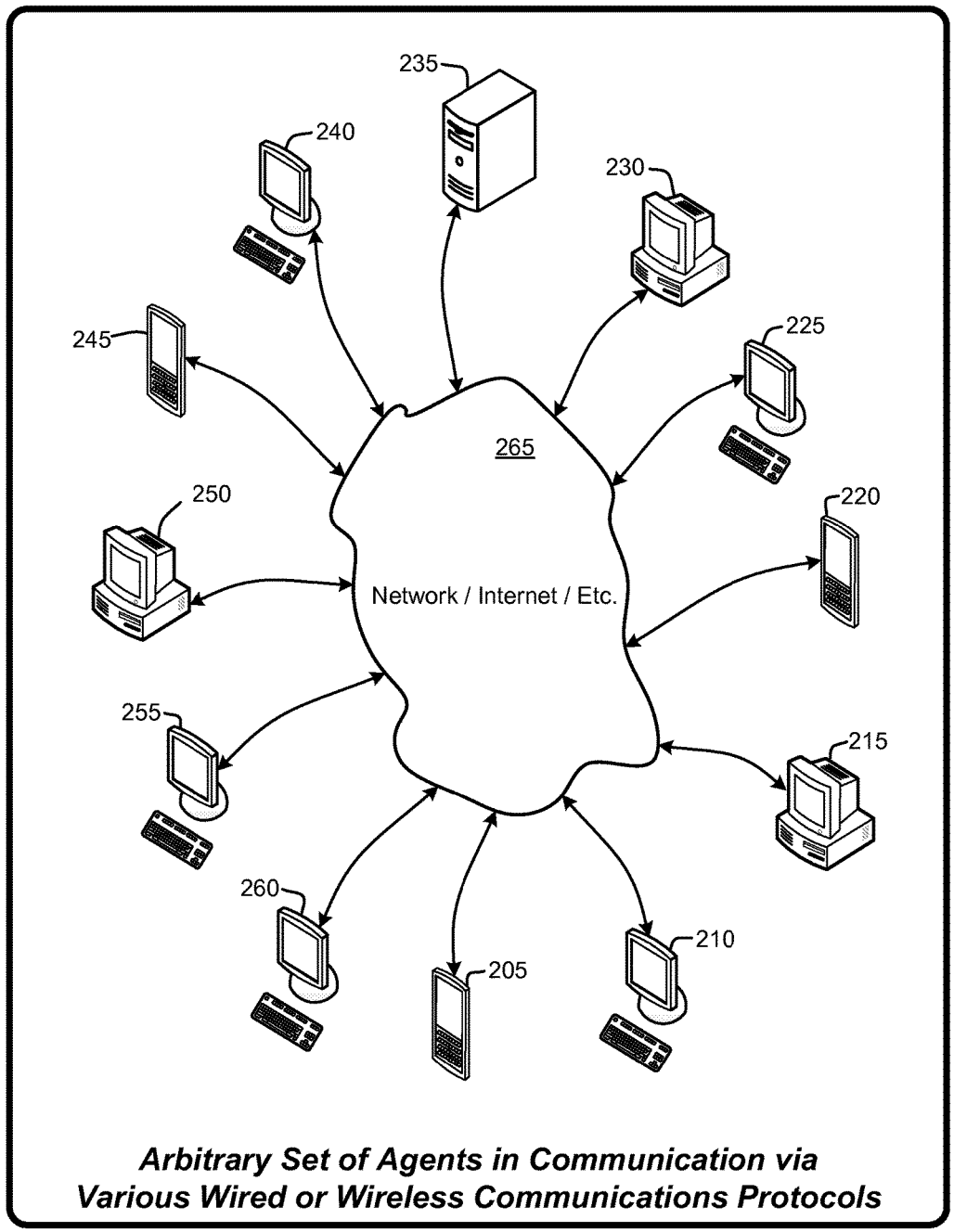
FIG. 2 provides illustration of a set of arbitrary agents in communication via various wired or wireless communications protocols, as described herein.

The above-described program modules are employed for implementing various embodiments of the Stochastic Clustering-Based Network Generator. As summarized above, the Stochastic Clustering-Based Network Generator provides various techniques that enable rapid formation of an interconnected hierarchical network structure from an arbitrary set of agents. Note that FIG. 2 illustrates an example of an arbitrary set of agents (205 through 260) that are in communication across a network or the internet 265 or some other communications net via various wired or wireless communications protocols.

The following sections provide a detailed discussion of the operation of various embodiments of the Stochastic Clustering-Based Network Generator, and of exemplary methods for implementing the program modules described in Section 1 with respect to FIG. 1. In particular, the following sections provides examples and operational details of various embodiments of the Stochastic Clustering-Based Network Generator, including: basic operation; additional optional embodiments and enhancements; and a discussion of an exemplary merge scenario for creating a hierarchical network structure from an arbitrary set of agents.

2.1 Basic Operation

As noted above, at each turn or round of the iterative turn-based coalescence process, each head node makes a random determination as to whether to receive requests or to issue requests. Agents making or issuing requests are referred to herein as "requestors," while agents receiving requests are referred to herein as "listeners."

Issuing a request amounts to contacting a randomly chosen agent from the entire set of agents with a merge request. Requests received by an agent that is not a head node are recursively passed by that agent to its head node. Requests received by a head node that is also a requestor agent are ignored. Requests received by a listener agent are considered for acceptance.

More specifically, the stochastic distributed coalescence processes described herein allows an arbitrary set of N participating agents to reliably and efficiently coalesce into a single hierarchal cluster without the need to rely on a centralized authority such as a central server computer or the like. The protocol first identifies each agent as a cluster (a singleton), and then proceeds in rounds as follows:

1. Each head node independently and randomly chooses to act either as a listener or as a requestor.
2. Each requestor independently sends a connection request to a uniformly random agent.
3. Agents that receive requests recursively pass them to their parents until the requests reach head nodes.
4. Each listening head node that receives only a single request accepts that request and forms a two-way connection with the requesting head node. For accepted requests, the cluster of the requesting head node is merged with the agent receiving its request, with that requestor becoming a child of that agent.
5. Each listening head node that receives multiple requests randomly chooses one request to accept. This acceptance results in a merge as described above in Step 4.

2.2 Additional Embodiments and Enhancements

The techniques described in Section 2.1 are adapted using various optional enhancements to improve the overall coalescence process as discussed below. In particular, the primary modification to the above-described process relates to the choice of which merge-request a cluster should approve if that cluster receives multiple requests. It has been observed that the modification to favor the smallest incoming request is sufficient to guarantee coalescence in a number of rounds that is logarithmic in N, while generally providing a more balanced hierarchical structure.

The protocol proceeds through a sequence of rounds. In contrast to the basic process described above, to enable the consideration of cluster size in choosing between multiple merge requests, agents maintain the following two pieces of information throughout the process: the identity of their "parent," and an integer value representing the current size of their connected component. At the beginning, each agent's parent is initialized to equal the agent itself (i.e., each agent is initially a singleton that is the head node of its own single-agent cluster), and all of the integers are initialized to equal 1. Throughout the process, whenever an agent's parent is equal to itself, it is called a "head node," and its integer will equal the size of its connected component (i.e., the total number of agents in the cluster).

Given this additional information, the following occurs at each round:

1. Each head node independently and randomly chooses to act either as a listener or as a requestor.
2. Each requestor independently sends a connection request to a uniformly random agent, including information about the current size of its connected component.
3. Agents that receive requests recursively pass them to their parents until the requests reach head nodes.
4. Each listening head node that only receives a single request accepts that request and forms a two-way connection with the requesting head node. For accepted requests, the cluster of the requesting head node is merged with the agent receiving its request, with that requestor becoming a child of that agent. The corresponding head node of the listener accepting the merge request then updates its integer count to include the number of agents in the newly merged cluster.
5. Each listening head node that receives multiple requests chooses the request coming from the smallest cluster, breaking ties if necessary. Further, as discussed above, the tie-breaking process can be random, a function of hierarchical depth, cluster network latency, etc. This acceptance results in a merge as described above in Step 4.

2.3 Exemplary Merge Scenario

Figure 3:
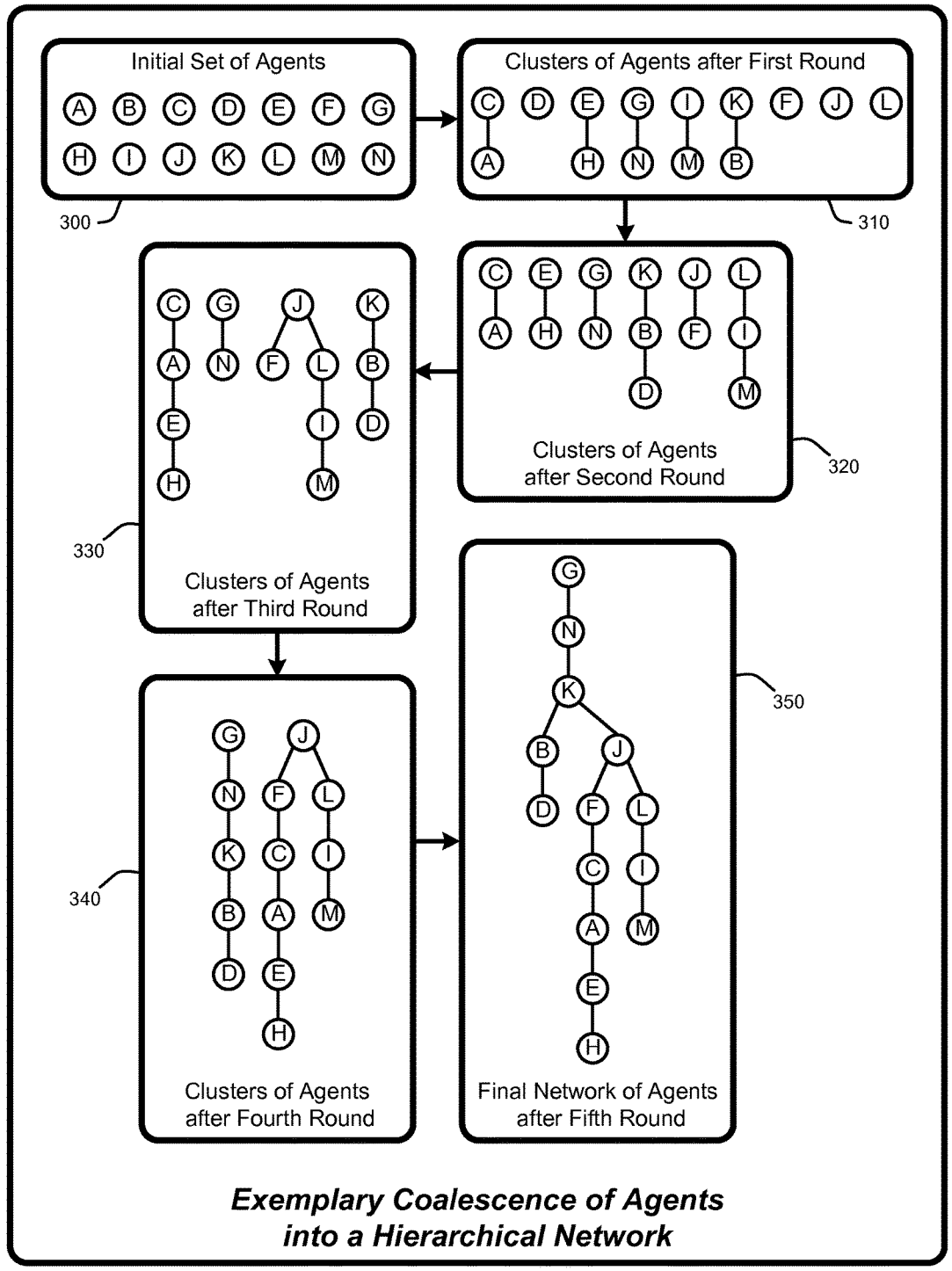
FIG. 3 illustrates an exemplary coalescence sequence for an arbitrary set of agents into a hierarchical network structure, as described herein.

FIG. 3 provides a simplified example of an exemplary merge scenario under which the techniques enabled by the Stochastic Clustering-Based Network Generator result in the rapid coalescence of an arbitrary set of agents into a hierarchical network. It should be understood that the example described below is provided only for purposes of explanation and is not intended to be representative of all of the different embodiments of the Stochastic Clustering-Based Network Generator described herein.

In particular, given an arbitrary set of agents 300, labeled A through N, in round 1 of the coalescence process, assume that Agents A, B, F, H, J, L, M and N randomly choose the requestor role, while Agents C, D, E, G, I, and K randomly choose listener role.

Requestors A, B, F, H, J, L, M and N then issue the following merge requests to randomly selected agents:
  A requests merge with C;
  B requests merge with K;
  F requests merge with M;
  H requests merge with E;
  J requests merge with C;
  L requests merge with A;
  M requests merge with I;
  N requests merge with G;

Results of the above-described merge requests are explained as follows:
  Both A and J requested a merge with C. A's request is randomly accepted by listener C for merge over J's. Note here that as discussed above, given the two requests, the acceptance decision can alternately be made using other criteria such as smallest cluster size, with tie breaking, as necessary;
  B's request to K is accepted since it is the only request to listener K;
  F's request to M ignored since both are requestors;
  H's request to E is accepted since it is the only request to listener E;
  L's request to A ignored since both are requestors;
  M's request to I ignored since both are requestors;
  N's request to G is accepted since it is the only request to listener G;

Once all of the above merge decisions have been made, the corresponding disjoint merges are performed for the accepted merge requests, resulting in the set of clusters shown in box 310.

As illustrated by box 310 of FIG. 3, Agents C, D, E, G, I, K, F, J and L are now head nodes. Therefore, for round 2, Agents D, G, I, and F randomly choose requestor role, while Agents C, E, K, J and L randomly choose listener role.

Requestors D, G, I, and F then issue the following merge requests to randomly selected agents:
 D requests merge with B;
 G requests merge with D;
 I requests merge with L;
 F requests merge with J;
Results of the above-described merge requests are explained as follows:
 D's request to B is accepted by head node K since it is the only request to listener K;
 G's request to D ignored since both are requestors
 I's request to L is accepted since it is the only request to listener L;
 F's request to J is accepted since it is the only request to listener J;
Once all of the above merge decisions have been made, the corresponding disjoint merges are performed for the accepted merge requests, resulting in the set of clusters shown in box 320.

As illustrated by box 320 of FIG. 3, Agents C, E, G, K, J and L are now head nodes. Therefore, for round 3, Agents E, K, and L randomly choose requestor role, while Agents C, G and J randomly choose listener role.

Requestors E, K, and L then issue the following merge requests to randomly selected agents:
 E requests merge with A;
 K requests merge with I;
 L requests merge with J;
Results of the above-described merge requests are explained as follows:
 E's request to A is accepted by head node C since it is the only request to listener C;
 K's request to I ignored since head node L of I is also a requestor
 L's request to J is accepted since it is the only request to listener J;
Once all of the above merge decisions have been made, the corresponding disjoint merges are performed for the accepted merge requests, resulting in the set of clusters shown in box 330.

As illustrated by box 330 of FIG. 3, Agents C, G, J, and K are now head nodes. Therefore, for round 4, Agents C and K choose requestor role, while Agents G and J randomly choose listener role.

Requestors C and K then issue the following merge requests to randomly selected agents:
 C requests merge with F;
 K requests merge with N;
Results of the above-described merge requests are explained as follows:
 C's request to F is accepted by head node J since it is the only request to listener J;
 K's request to N is accepted by head node G since it is the only request to listener G;
Once the above merge decisions have been made, the corresponding disjoint merges are performed for the accepted merge requests, resulting in the set of clusters shown in box 340.

As illustrated by box 340 of FIG. 3, Agents G and J are now head nodes. Therefore, for round 5, Agents J randomly chooses requestor role, while Agent G randomly chooses listener role.

Requestor J then issues the following merge requests to a randomly selected agent:
 J requests merge with K;
Results of the above-described merge request is explained as follows:
 J's request to K accepted by head node G since it is the only request to listener G;
Once the above merge decision has been made, the corresponding disjoint merge is performed for the accepted merge request, resulting in the set of clusters shown in box 350. Finally, as illustrated by box 350 of FIG. 3, following the fifth round, all of the agents are now in a single hierarchical network structure. Therefore, the coalescence process terminates.

3.0 Exemplary Operating Environments

Figure 4:
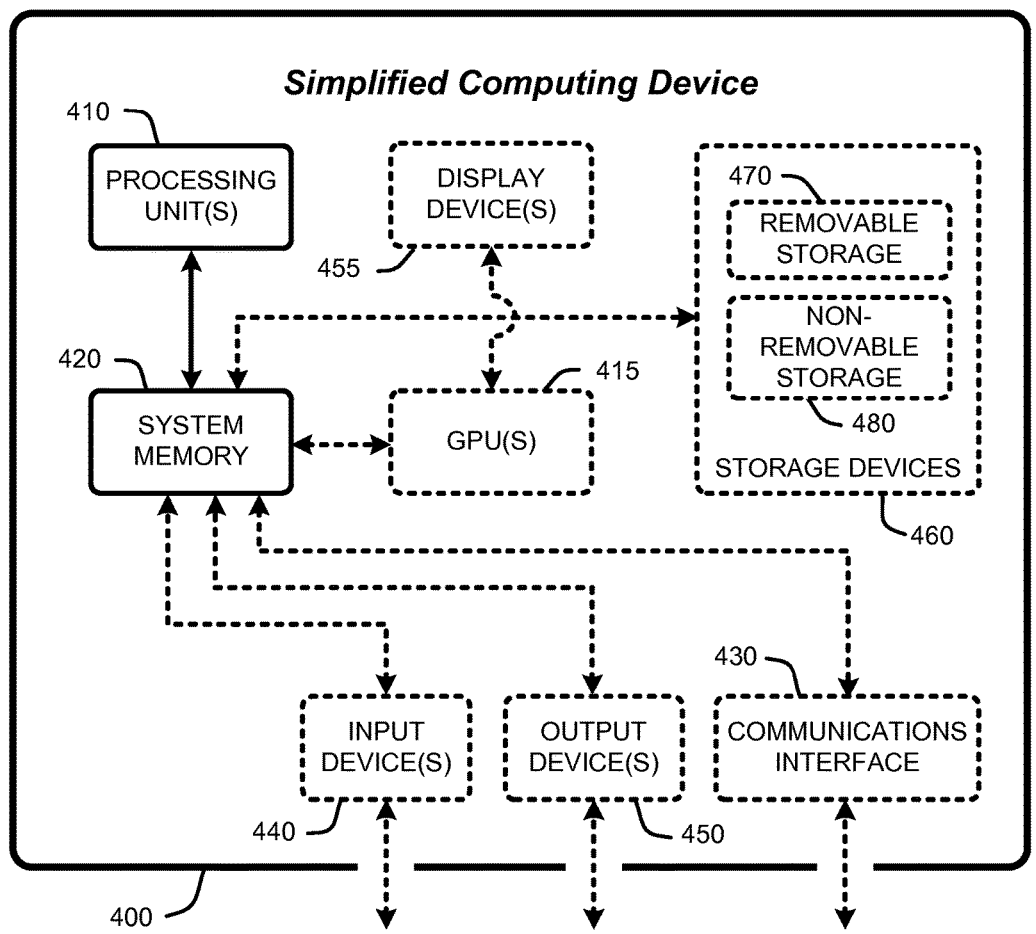
FIG. 4 is a general system diagram depicting a simplified general-purpose computing device having simplified computing and I/O capabilities for use in implementing various embodiments of the Stochastic Clustering-Based Network Generator, as described herein.

The Stochastic Clustering-Based Network Generator described herein is operational within numerous types of general purpose or special purpose computing system environments or configurations. FIG. 4 illustrates a simplified example of a general-purpose computer system on which various embodiments and elements of the Stochastic Clustering-Based Network Generator, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device such as computer 400. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Stochastic Clustering-Based Network Generator, the device should have a sufficient computational capability and system memory to enable basic computational operations as well as some form of network communications capabilities. In particular, as illustrated by FIG. 4, the computational capability is generally illustrated by one or more processing unit(s) 410, and may also include one or more GPUs 415, either or both in communication with system memory 420. Note that that the processing unit(s) 410 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional computer output devices 450 (e.g., display device(s) 455, audio output devices, video output devices, devices for transmitting wired or wireless data transmissions, etc.). Note that typical communications interfaces 430, input devices 440, output devices 450, and storage devices 460 for general-purpose computers are well known to those skilled in the art, and will not be described in detail herein.

The simplified computing device of FIG. 4 may also include a variety of computer readable media. Computer readable media can be any available media that can be accessed by computer 400 via storage devices 460 and includes both volatile and nonvolatile media that is either removable 470 and/or non-removable 480, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Stochastic Clustering-Based Network Generator described herein, or portions thereof, may be stored, received, transmitted, or read from any desired combination of computer or machine readable media or storage devices and communication media in the form of computer executable instructions or other data structures.

Finally, the Stochastic Clustering-Based Network Generator described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Stochastic Clustering-Based Network Generator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Stochastic Clustering-Based Network Generator. It is intended that the scope of the invention be limited not by this detailed description, but rather by the claims appended hereto.

What is claimed is:

1. A method for forming a hierarchical network from an arbitrary set of agents, comprising steps for:
   initially designating each agent of an arbitrary set of agents as a head node of its own single-agent hierarchical cluster;
   initiating an iterative process comprising steps for:
      causing each head node of each hierarchical cluster to randomly choose between a role as a requestor and a role as a listener;
      for each requestor, randomly selecting an agent from the set of agents and sending a merge request to that agent;
      for each agent receiving a merge request, recursively passing that merge request to that agents head node;
      for each head node acting as a listener that receives only a single merge request, causing the head node to accept the merge request;
      for each head node acting as a listener that receives multiple merge requests, causing the head node to select a single one of the multiple merge requests;
      for all accepted merge requests, performing a separate disjoint merge to merge the hierarchical cluster of the requestor as a child cluster to the agent receiving the corresponding merge request; and
   repeating the steps of the iterative process until only a single hierarchical cluster remains for the arbitrary set of agents.

2. The method of claim 1 wherein causing the head node to select a single one of the multiple merge requests further comprising steps for randomly selecting one of the multiple merge requests.

3. The method of claim 1 wherein each requestor keeps track of and sends its current hierarchical cluster size along with the merge request.

4. The method of claim 3 wherein causing the head node to select a single one of the multiple merge requests further comprising steps for selecting the merge request from the head node having the smallest hierarchical cluster size.

5. The method of claim 4 further comprising steps for breaking a tie of the smallest hierarchical cluster size between two or more head nodes by accepting one of the merge requests of tying head nodes randomly.

6. The method of claim 4 further comprising steps for breaking a tie of the smallest hierarchical cluster size between two or more head nodes by accepting one of the merge requests of the tying head nodes having a smallest hierarchical depth.

7. The method of claim 4 further comprising steps for breaking a tie of the smallest hierarchical cluster size between two or more head nodes by accepting one of the merge requests of the tying head nodes having a smallest network latency.

8. A system for forming a hierarchical network of agents, comprising:
- a device for identifying an arbitrary set of agents having network communications capabilities;
- a device for providing each agent contact information for each other agent;
- a device for initially designating each agent as a root of its own single-agent hierarchical cluster;
- a device for initiating a round-based coalescence process comprising:
  - a device for causing each root of each hierarchical cluster to randomly choose between a role as a requestor and a role as a listener;
  - a device for causing each requestor to randomly select an agent from the set of agents and sending a merge request to that agent;
  - a device for causing each agent receiving a merge request to recursively pass that merge request to that agents root;
  - a device for causing each listener that receives only a single merge request to accept the merge request;
  - a device for causing for each listener that receives multiple merge requests to select a single one of the multiple merge requests;
  - a device for performing a separate disjoint merge for all accepted merge requests to merge the hierarchical cluster of the corresponding requestor as a child cluster to the agent receiving the corresponding merge request; and
- a device for iterating the round-based coalescence process until only a single hierarchical cluster remains for the arbitrary set of agents.

9. The system of claim 8 wherein causing each listener to select a single one of the multiple merge requests further comprises randomly selecting one of the multiple merge requests.

10. The system of claim 8 wherein each requestor keeps track of and sends its current hierarchical cluster size along with the merge request.

11. The system of claim 10 wherein causing each listener to select a single one of the multiple merge requests further comprises selecting the merge request from the root having the smallest hierarchical cluster size.

12. The system of claim 11 further comprising breaking a tie of the smallest hierarchical cluster size between two or more roots by accepting the merge request of one of the tying roots randomly.

13. The system of claim 11 further comprising breaking a tie of the smallest hierarchical cluster size between two or more head nodes by accepting one of the tying head nodes having a smallest hierarchical depth.

14. The system of claim 11 further comprising breaking a tie of the smallest hierarchical cluster size between two or more head nodes by accepting one of the tying head nodes having a smallest computed network latency.

15. A computer-readable storage device having computer executable instructions stored therein for causing an arbitrary set of agents to coalesce into a hierarchical network of agents, comprising instructions for:
- providing each agent contact information for each other agent;
- initially designating each agent as a root of its own single-agent hierarchical cluster;
- initiating a round-based coalescence process comprising:
  - causing each root of each hierarchical cluster to randomly choose between a role as a requestor and a role as a listener;
  - causing each requestor to randomly select an agent from the set of agents and sending a merge request to that agent;
  - causing each agent receiving a merge request to recursively pass that merge request to that agents root;
  - causing each listener that receives only a single merge request to accept the merge request;
  - causing for each listener that receives multiple merge requests to select a single one of the multiple merge requests;
  - performing a separate disjoint merge for all accepted merge requests to merge the hierarchical cluster of the corresponding requestor as a child cluster to the agent receiving the corresponding merge request; and
- iterating the round-based coalescence process until only a single hierarchical cluster remains for the arbitrary set of agents.

16. The computer-readable storage device of claim 15 wherein causing each listener to select a single one of the multiple merge requests further comprises randomly selecting one of the multiple merge requests.

17. The computer-readable storage device of claim 15 wherein each requestor keeps track of and sends its current hierarchical cluster size along with the merge request.

18. The computer-readable storage device of claim 17 wherein causing each listener to select a single one of the multiple merge requests further comprises selecting the merge request from the root having the smallest hierarchical cluster size.

19. The computer-readable storage device of claim 18 further comprising breaking a tie of the smallest hierarchical cluster size between two or more roots by accepting the merge request of one of the tying roots randomly.

20. The computer-readable storage device of claim 18 further comprising breaking a tie of the smallest hierarchical cluster size between two or more head nodes by accepting one of the tying head nodes having a smallest hierarchical depth.

* * * * *